United States Patent [19]
Crider

[11] 4,260,902
[45] Apr. 7, 1981

[54] FLUID-DRIVEN ROTARY ENGINE

[76] Inventor: William A. Crider, 1216 Kelley St., SW., Vienna, Va. 22180

[21] Appl. No.: 964,171

[22] Filed: Nov. 28, 1978

[51] Int. Cl.³ .............. F03B 13/00; F03B 13/10; H02P 9/04; F03B 17/06
[52] U.S. Cl. ........................ 290/43; 290/54; 60/398; 60/640
[58] Field of Search .......... 290/43, 54, 52; 60/398, 60/639, 640; 415/80, 82, 63

[56] References Cited

U.S. PATENT DOCUMENTS

| | | | |
|---|---|---|---|
| 935,046 | 9/1909 | McLaren | 415/80 |
| 2,499,715 | 3/1950 | Blevins | 60/640 |
| 3,360,926 | 1/1968 | Parr | 60/22 |
| 3,651,635 | 3/1972 | Clay | 60/9 |

Primary Examiner—J. V. Truhe
Assistant Examiner—John B. Conklin
Attorney, Agent, or Firm—LeBlanc, Nolan, Shur & Nies

[57] ABSTRACT

A fluid driven rotary engine of the water wheel type comprising a spoked water wheel rotatably mounted on a hollow stationary axle and having a set of water collection containers supported on the outer ends of hollow hub-mounted wheel spokes. Water or other liquid is delivered under pressure or an available head to the interior of the axle and from there through the hollow spokes and nozzles at the ends of the spokes into the containers to impart rotation to the water wheel.

13 Claims, 17 Drawing Figures

FLUID-DRIVEN ROTARY ENGINE

FIELD OF INVENTION

This invention relates to fluid-driven rotary engines or motors and is particularly concerned with water wheels for converting energy of flowing or falling water into mechanical rotary motion.

BACKGROUND

In the past various types of water wheels or water driven engines have been used for the purpose of converting the kinetic energy in a flowing or falling body of water into mechanical rotary motion which is then used for generating electricity or for some other useful purpose. Prior water wheels typically comprise an array of water-receiving buckets or vanes arranged around the periphery of the wheel to be acted upon in some way by the flowing or falling body of water.

In some water-driven engine constructions water is delivered in a free falling stream into the open ends of the buckets mentioned above, causing the water-driven device to be driven by the weight of water received in the buckets. In other constructions of the water wheel type the water is customarily delivered in jets issuing from nozzles to impinge against either buckets or vanes extending around the periphery of the water wheel. In this type of water wheel the nozzles are conventionally located exteriorly of the buckets at some position beyond the perimeter of the water wheel. With this arrangement the nozzles deliver the streams or jets of water inwardly toward the wheel and into the open ends of the buckets to thrust against the buckets, causing the wheel to rotate.

Representative teachings of the foregoing water-driven engine constructions are found in U.S. Pat. No. 467,840 which issued to J. C. Walker on Jan. 26, 1892, U.S. Pat. No. 125,843 which issued to R. C. Parvin on Apr. 16, 1872, U.S. Pat. No. 3,984,698 which issued to J. J. Brewer on Oct. 5, 1976, U.S. Pat. No. 2,163,102 which issued to H. Odill on June 20, 1939, U.S. Pat. No. 3,671,756 which issued to E. S. Meier on June 20, 1972, U.S. Pat. No. 4,112,686 which issued R. Trotta on Sept. 12, 1978, and U.S. Pat. No. 3,958,130 which issued to B. Van Mechelen on May 18, 1976.

SUMMARY AND OBJECTS OF INVENTION

As compared with the prior constructions described above, the present invention provides for a novel, efficient, inexpensive water wheel or rotary engine construction in which the water or other motive fluid is delivered through a hollow stationary axle for the wheel and from there through hollow conduit-like wheel spokes or arms to buckets or containers attached to the water-discharging ends of the spokes. The weight of the water entering the buckets imparts rotation to the wheel, causing the buckets to rotate through a station where the open bucket ends face in a direction to dump the water accumulated therein. Thereafter, the buckets each move upwardly from the dumping station through a filling station where water is again delivered to the buckets for recurrently repeating the filling and dumping cycle.

In a preferred embodiment the hollow spokes terminate in nozzles within the buckets. The nozzles are oriented to tangentially discharge the jets of water toward the open bucket ends in the direction opposite to the rotation of the water wheel. By this arrangement the propulsive action of the jets issuing from the nozzles contributes to the overall force that is applied to impart rotation to the water wheel.

The complete water wheel unit of this invention may incorporate a suitable alternator or generator which is driven by the water wheel for generating electricity. Additionally, the water dumped from the buckets or containers may be collected and pumped back to the hollow axle to recirculate the water through the water wheel. Furthermore, water collected from one water wheel may be delivered to a like water wheel at a lower elevation, whereby the two water wheels are arranged to be serially driven by a descending stream or body of water.

In addition to the foregoing more than one water wheel assembly may be rotated on a common stationary axle. In such a construction one water wheel may be connected to drive the armature of a generator in one direction while another water wheel is connected to drive the generator's field coils in the opposite direction.

With the foregoing in mind it is the general aim and purpose of this invention to provide a novel fluid driven rotary engine, particularly of the water wheel type, which is efficient in operation and which is inexpensive to manufacture.

Another important object of this invention is to provide a novel water wheel which is of efficiently organized, simplified construction.

Still another object of this invention is to provide a novel water wheel wherein water or other motive fluid is delivered through a hollow, stationary axle and through hollow wheel spokes to buckets or containers attached to the ends of the wheel spokes for imparting rotation to the water wheel.

Still another object of this invention is to provide a novel water wheel of the type described in the last preceding object wherein jets of the water or other motive fluid issue from nozzles at the ends of the hollow spokes within the containers to produce a jet action for driving the water wheel.

Further objects of this invention will appear as the description proceeds in connection with the appended claims and below-described drawings.

DETAILED DESCRIPTION

Figure 1:
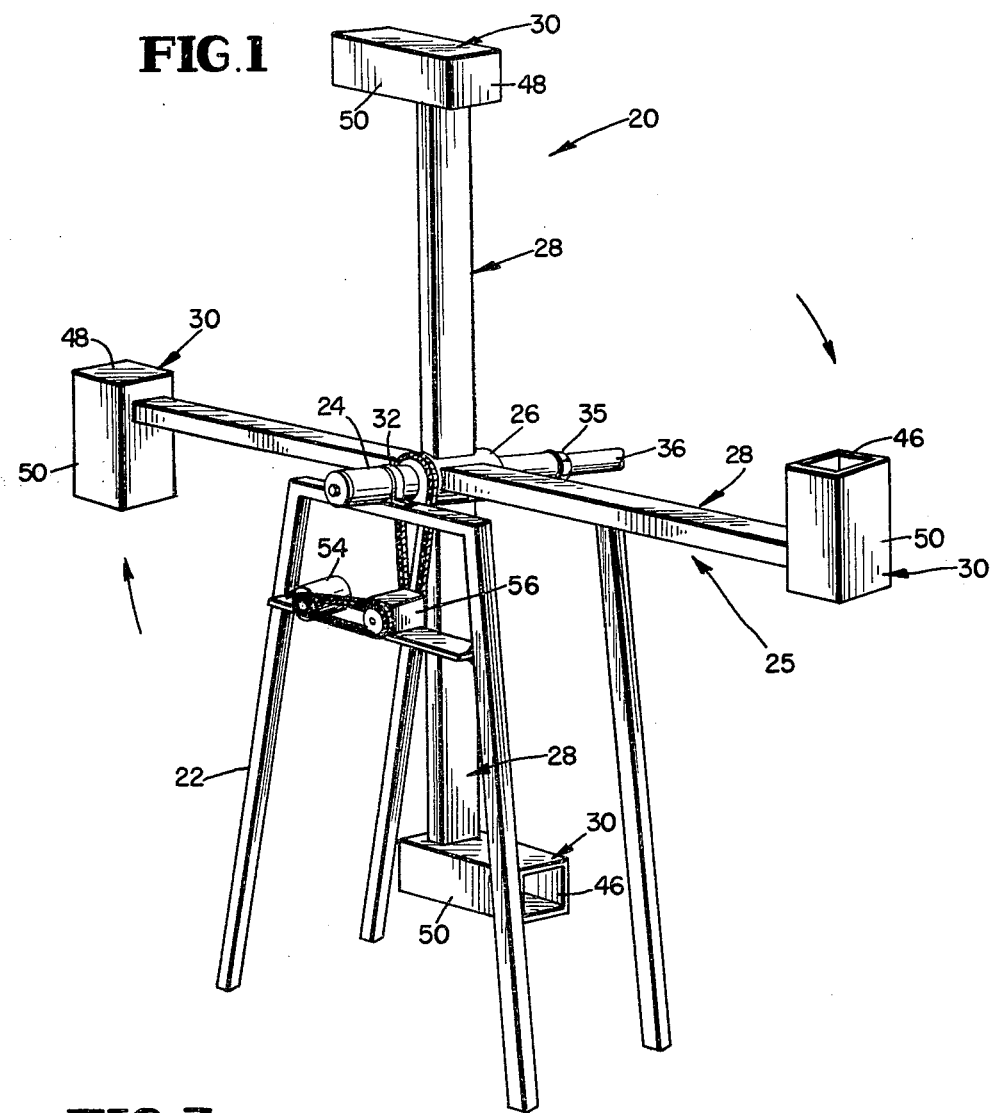
FIG. 1 is a perspective view of a water wheel unit incorporating various principles of this invention.
Figure 2:
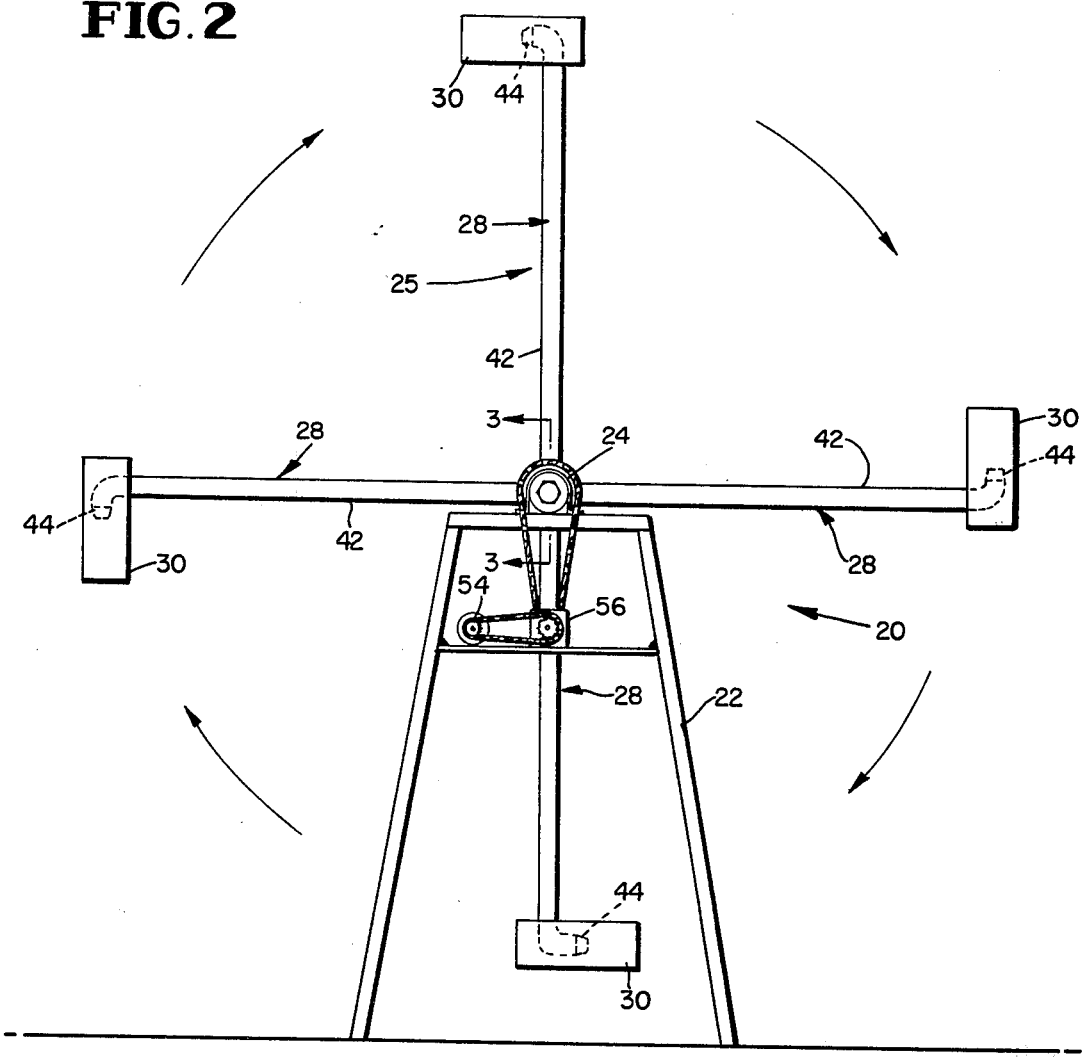
FIG. 2 is a front elevation of the water wheel shown in FIG. 1.

Referring to the drawings and particularly to FIGS. 1 and 2, one embodiment of a water wheel unit incorporating various principles of this invention is generally indicated at 20 and is shown to be mounted on the upper end of a rigid tower or stand 22 such that the horizontal rotational axis of the water wheel is at a level above the ground or floor surface on which the tower is supported. Water wheel 20 comprises a tubular, stationary axle 24 and a wheel assembly 25 mounted on axle 24 for rotation about the axle's longitudinal axis. Wheel assembly 25 mainly comprises a wheel hub or sleeve 26 coaxially receiving and rotatably supported on axle 24, a set of hollow elongated conduit-like wheel spokes 28 and a corresponding number of water-receiving buckets or containers 30. In the illustrated embodiment there are four spokes and four water-receiving containers. It will be appreciated, however, that any suitable number of spokes and containers may be used.

Axle 24 is rigidly fixed to the top of tower 22 by suitable means such as brackets 32. The other end of axle 24 is open and connected by a coupling 35 to a water pipe 36. Pipe 26 is connected to an elevated body of water such as a reservoir or lake for delivering water to the interior of axle 24. Axle 24 has a water discharge port 37 for delivering the incoming water to spokes 28 in a manner to be explained in detail later on.

Figure 3:
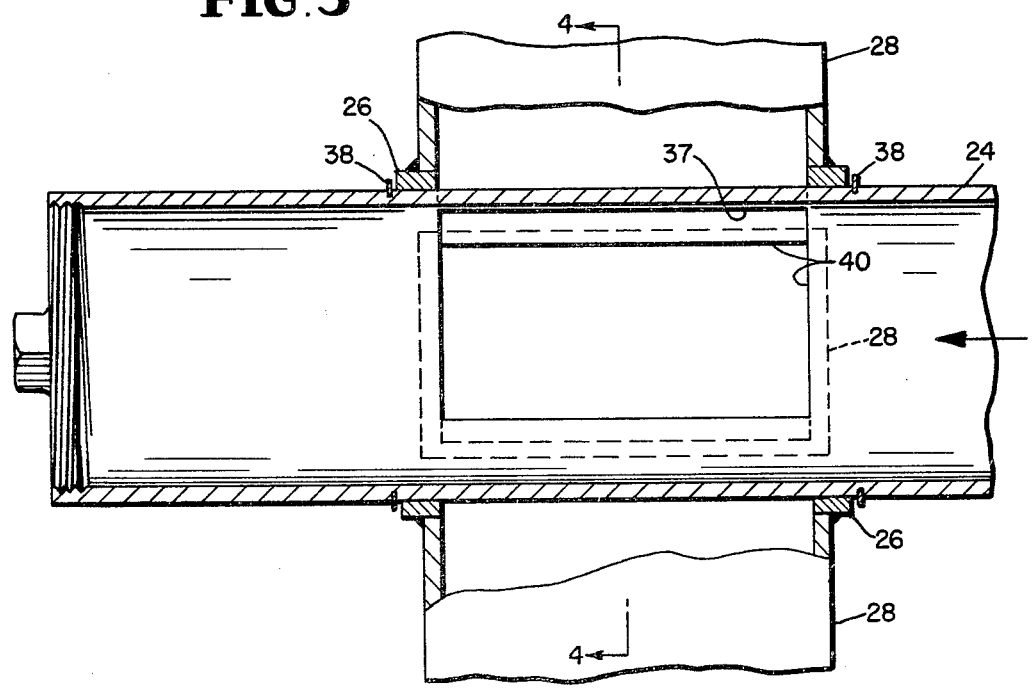
FIG. 3 is a section taken substantially along lines 3—3 of FIG. 2.
Figure 4:
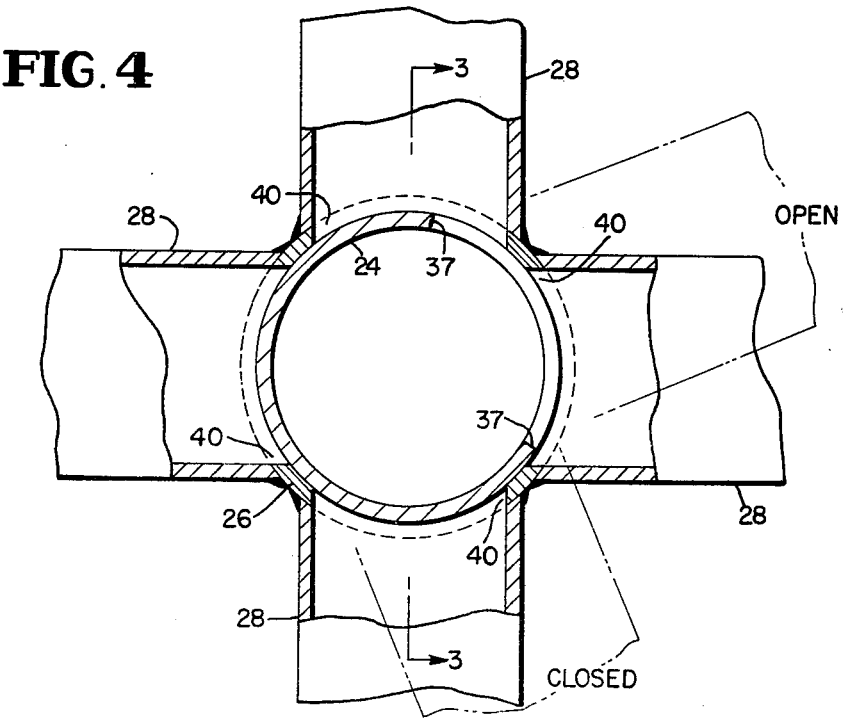
FIG. 4 is a section taken substantially along lines 4—4 of FIG. 3.
Figure 5:
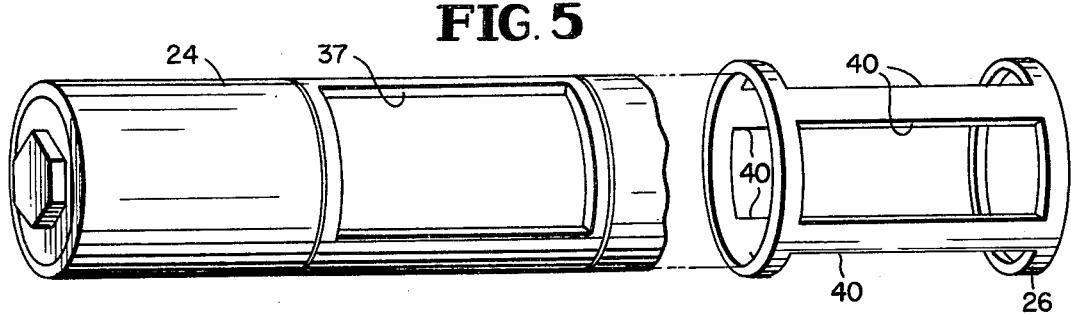
FIG. 5 is a fragmentary exploded view of the stationary hollow axle and rotatable wheel hub shown in the preceding Figures.
Figure 6:
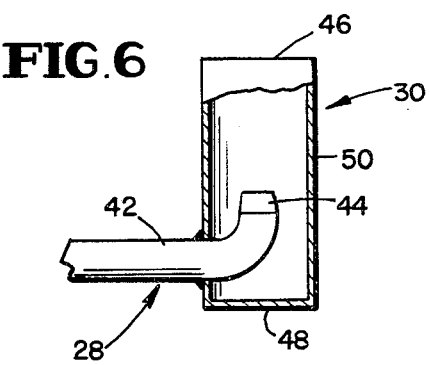
FIG. 6 is an enlarged fragmentary view of the water nozzle end of one of the water wheel spokes within its associated container, the container being partially broken away to illustrate the configuration of the water-discharging nozzle.

As best shown in FIGS. 3–5, hub 26 is formed with a cylindrically smooth inner periphery seating against the exterior cylindrical surface of axle 24. Hub 26 is confined against axial displacement on axle 24 by a pair of groove-seated retainer rings 38 or any other suitable means. Hub 26 is formed with a set of equiangularly spaced apart uniformly sized ports or apertures 40 corresponding in number to the number of spokes 28. Ports 40 are coextensively formed through the cylindrical side wall of hub 26 and may be of any suitable configuration. In the illustrated embodiment ports 40 are provided with a rectangular configuration as shown.

Each of the water wheel spokes 28 is rigidly fixed at its inner end to hub 26 in registry with a different one of the hub's ports 40. Spokes 28 may be of any suitable configuration in cross-section. For example, spokes 28 may be rectangular to conform to the illustrated configuration of ports 40.

As shown, spokes 28 extend radially outwardly from hub 26 and are equiangularly spaced apart about the common axis of hub 26 and axle 24. Each of the spokes 28 is formed with a straight radially extending spoke portion 42 which terminates at its outer end remote from hub 26 in a water discharge nozzle 44.

The water-receiving containers 30 are fixed on to each of the spokes 28 at the outer end thereof and may be of any suitable configuration. Accordingly to one suitable construction each container 30 is formed with an open end 46, a closed bottom 48 and water-confining side walls 50 extending from bottom 48 and delimiting the open end 46. In the illustrated embodiment containers 30 are shown to be of rectangular configuration and open in a common direction opposite to that in which wheel 25 rotates.

Wheel spokes 28 are of like configuration and are uniformly dimensioned. As shown, the nozzle 44 for each wheel spoke extends normal or at right angles to its radially extending spoke portion 42 to extend along an axis that lies tangential to a circle havings its center coincident with the rotational axis of wheel assembly 25. Each of the nozzles 44 opens towards the open end 46 of its associated container 30 in a direction facing away from the direction in which wheel assembly 25 rotates.

Each of the nozzles 44 may be round and slightly converging. Alternatively, nozzles 44 may be of the nonconverging type. If spokes 42 are tubular or round, nozzles 44 may be of the same diameter as the spokes. As shown, each nozzle 44 faces the open container end 46 to discharge the jet of water toward the open container end. Each of the spokes 28 extends into its associated container 30 near the container's closed bottom 48 such that the discharge end of the spoke's nozzle 44 lies within the container inwardly of the container's open end 46.

Each of the ports 40 in hub 26 is positioned to advance into and out of registry with the axle port 37 as wheel assembly 25 is rotated. When each of the hub ports 40 registers or partially registers with axle port 37 water will flow under pressure from the interior of axle 24 through the axle port 37, through the hub port 40 in registry therewith, and through the associated hollow wheel spoke 28 into the container 30 at the outer end thereof.

For the four spoke water wheel construction shown in the drawings the axle discharge port 37 may extend circumferentially through an angle exceeding the 90° angular spacing between adjacent spokes 28. In this embodiment port 37 circumferentially extends through an angle of about 123°.

As shown, port 37 circumferentially extends from one edge near a vertical plane to its other edge which lies about 33° below a horizontal plane. For the orientation of containers 30 and nozzles 44 shown in the drawings port 37 extends circumferentially between extremeties at or near to 12 o'clock and 4 o'clock to thereby define a filling station at which water will be delivered to the spokes 28 and hence to the containers 30 at the outer ends thereof as the spokes 28 each rotate through the angle extending from the 12 o'clock position to the 4 o'clock position mentioned above. From the foregoing description it will be appreciated that the central axis of port 37 lies about medially between the above mentioned 12 and 4 o'clock positions.

In operation of the water wheel construction thus far described it will be appreciated that water under pressure or an available head is delivered by pipe 36 to the interior of the stationary axle 24. As each of the spokes 28, rotating clockwise as viewed from FIG. 1, advances to the 12 o'clock position (i.e., the vertical position above the water wheel's rotational axis) the spoke's associated hub port 40 will come into registry with the axle port 37 thereby establishing fluid communication between the interior of the wheel spoke and the interior of the stationary axle 24. As a result water within axle 24 will be delivered through axle port 37 and the hub port 40 in registry therewith and into the interior of the wheel spoke 28. Water therefore flows through the wheel spoke 28 and discharges through its nozzle 44 into the interior of the associated container 30 as the wheel spoke rotates downwardly from the 12 o'clock position of the filling cycle towards the 4 o'clock position marking the termination of the filling cycle.

It will be noted that as each of the wheel spokes 28 rotates downwardly from the 12 o'clock position mentioned above, the open end of its associated container 30 will face upwardly, thereby collecting and confining the water discharged from the nozzle 44 therein. The weight of the water collected in each container 30 thereby exerts a force on the outer end of the wheel spokes to produce a torque for rotating wheel assembly 25 is a clockwise direction as viewed from FIGS. 1 and 2 of the drawings.

It also will be noted that as one of the wheel spokes 28 reaches the 3 o'clock position (i.e., the horizontal position) in the filling cycle the trailing wheel spoke immediately behind it will have advanced to the 12 o'clock position mentioned above so that for approximately 33° of angular displacement of wheel assembly 25, water will be delivered through two of the wheel spokes 28 to their associated containers 30. Filling of the trailing one of the two containers 30 at the filling station will therefore overlap the filling of the container ahead of it. By this operation it will be appreciated that throughout a complete revolution at least one of the containers 30 will be in the process of being filled with water. Accordingly, a force will continuously be applied to steadily and smoothly rotate wheel assembly 25.

The jets of water issuing from nozzles 44 as the nozzles pass through the filling station from the 12 o'clock to the 4 o'clock positions mentioned above develops a propulsive force for rotating wheel assembly 25 in addition to the force resulting from the weight of water collected in the containers 30 as the containers move through the filling station. Accordingly, rotation of wheel assembly 25 will result from the jet propulsive force as well as the force resulting from the weight of water collected in containers 30 and also the momentum of the rotating water wheel. Flow of water through wheel spokes 28 is aided by the centrifugal force developed by the rotating water wheel.

Preferably, the velocity of the jets issuing from nozzles 44 is made low enough so that the water jets are not ejected out of the containers 30 through the open ends thereof, but instead remain within the containers, thus allowing for the collection of the water within the containers. It also will be appreciated that suitable means such as a throttling valve (not shown) in the water pipe 36 may be used for regulating the velocity of the water jets.

As each of the water-ladened containers 30 rotates downwardly through its 4 o'clock position it will begin to tip towards the horizontal sufficiently to begin to dump or spill the water therein. The dumping or spilling of the water from each container 30 may continue through the 6 o'clock position (i.e., the vertical position below the rotational axis of the water wheel). As each of the containers 30 passes through the 6 o'clock position it will completely empty and will begin its upward travel where its open end 46 faces downwardly. Accordingly, throughout the travel in which two of the containers 30 are being filled at the same time, the other two will be empty and will be advancing upwardly toward the 12 o'clock position where the filling cycle begins.

Efficient use of the available pressure or water head is thus achieved by the combined effect of the weight water accumulated in containers 30 and the water jets issuing from nozzles 44 as well as the arrangement for delivering the water to the containers 30 by way of the hollow spokes 28. The water wheel of this invention is therefore efficient in operation as well as being of simplified and inexpensive construction.

Figure 7:
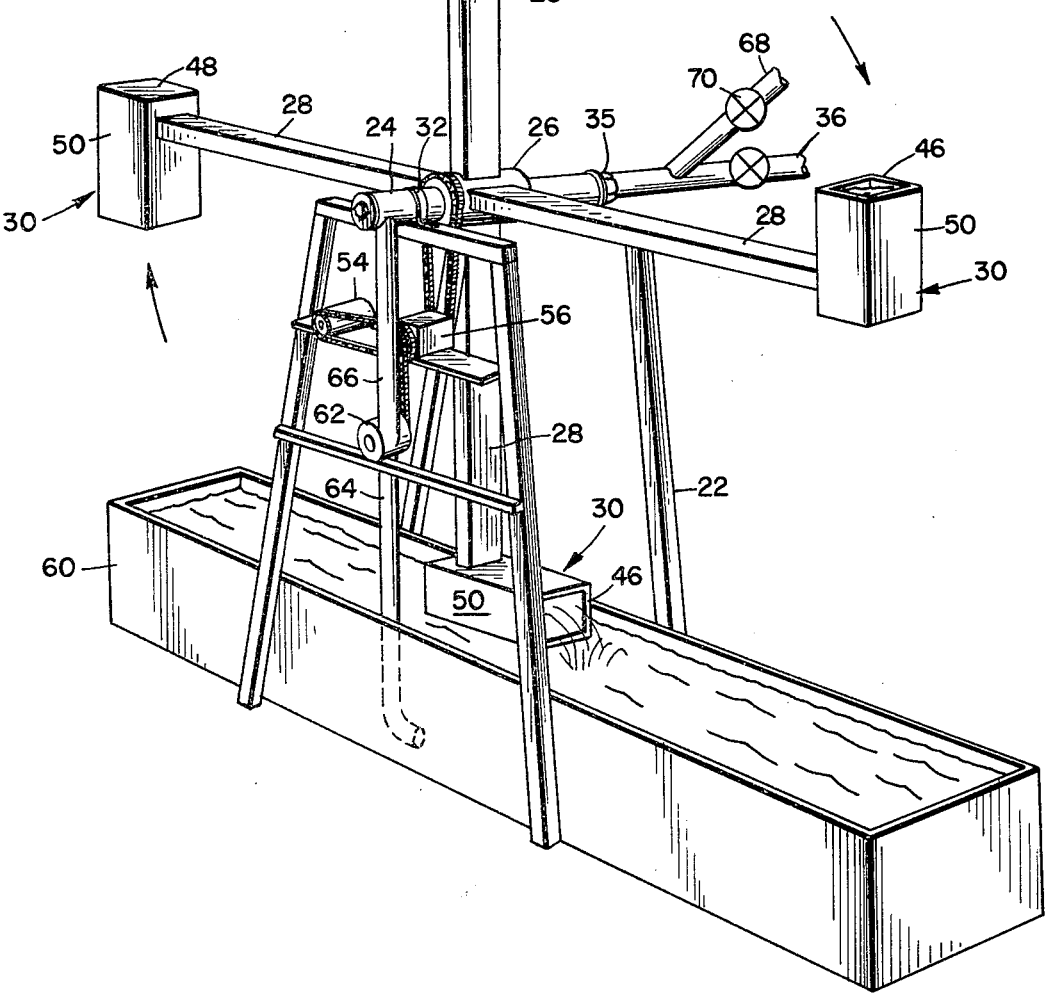
FIG. 7 is a perspective view similar to FIG. 1, but showing a trough and pump incorporated into the water wheel unit for recycling the dumped water.

The water dumped from containers 30 may be collected in a trough such as the one shown in FIG. 7 or it may be returned to a body of water (e.g., a stream) to be utilized elsewhere.

As shown in FIGS. 1 and 2 the water wheel unit 20 may be equipped with an alternator or generator 54 which is drive connected to hub 26 by suitable means such as a belt and pulley assembly or transmission gearing 56. Alternator 54 is thereby driven by rotation of the water wheel to generate electricity.

The embodiment shown in FIG. 7 is the same as that shown in the preceding figures except that the water wheel unit illustrated in FIG. 7 is equipped with a water collection trough 60 and a water-recycling pump 62. Like reference numerals have been applied to designate like parts of the water wheel constructions shown in FIGS. 1 and 7.

As shown in FIG. 7, trough 60 may be positioned on the ground below water wheel assembly 25 in a position where it receives and collects the water dumped from containers 30. The inlet port of pump 62 is connected by an inlet pipe 64 to trough 60. The outlet port of pump 62 is connected by a discharge pipe 66 to axle 24.

Operation of pump 62 results in the withdrawal of water from trough 60 and the delivery of the withdrawn water back to the interior of axle 24 for recirculation through the water wheel spokes 28. Pump 62 may be connected to be driven by any suitable power source and may be used to continue operation of the water wheel without interrupting the generation of electricity by alternator 54 in situations where the available body of water, water head or water pressure normally used to drive water wheel 25 is cut off.

To start the water wheel in its recycling mode of operation in which pump 62 is utilized, a water inlet pipe 68 having a gate valve 70 may be connected to the hollow axle 24 to deliver water from a suitable source (such as a hydrant or water tank). To initiate rotation of the water wheel gate valve 70 is opened to deliver water under pressure or available head to the water wheel thus imparting rotation to the water wheel. As the water wheel begins to rotate pump 62 is then energized and gate valve 70 is closed, thereby allowing the water wheel to be driven by the water recycled or recirculated by pump 62.

Figures 8, 9:
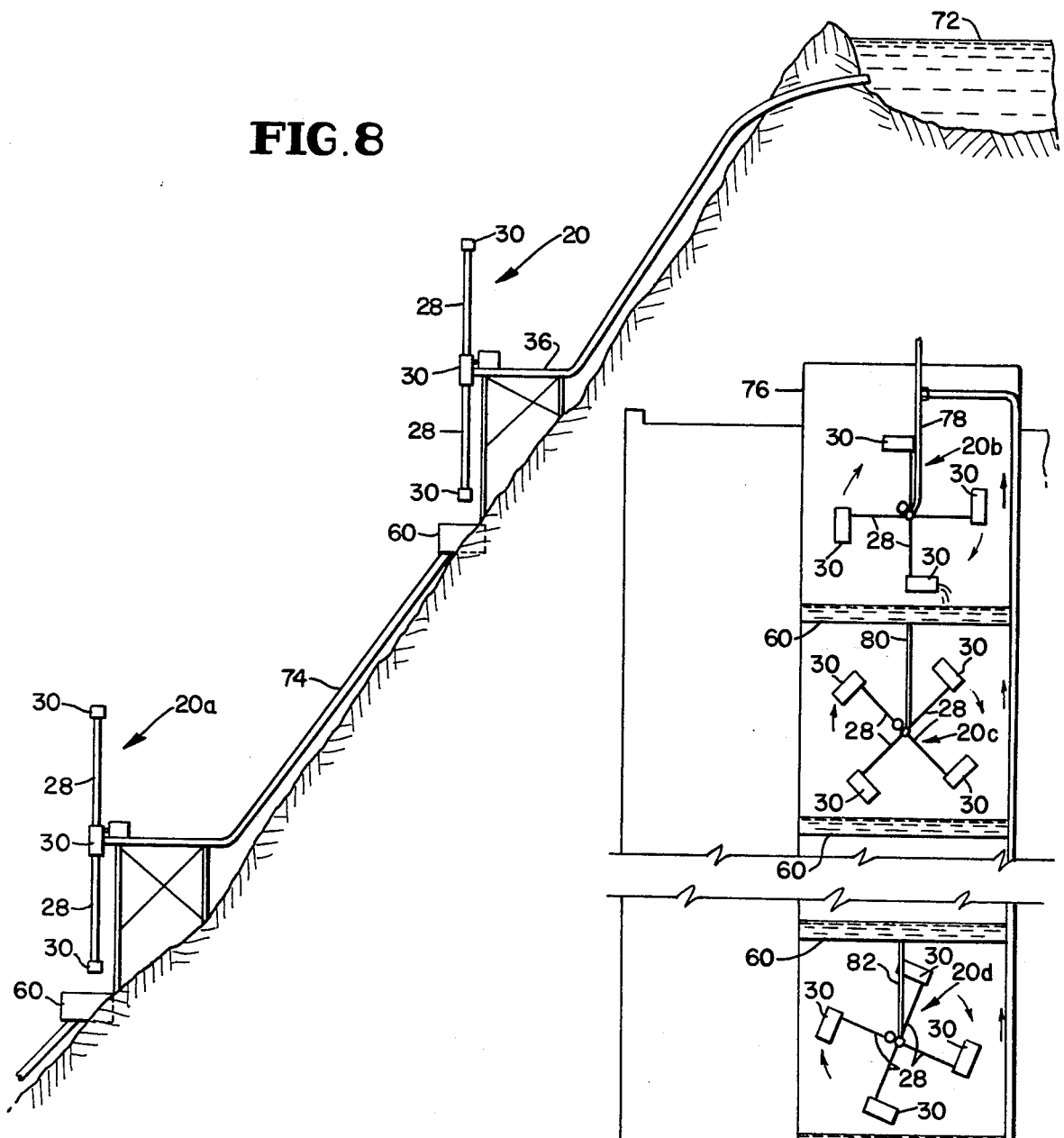
FIG. 8 is a side elevation showing two of the water wheels of FIG. 1 located at different elevations along a slope below a lake, reservoir or other raised body of water.
FIG. 9 illustrates a front elevation of a set of the water wheels of this invention arranged in a vertical column.
Figure 10:
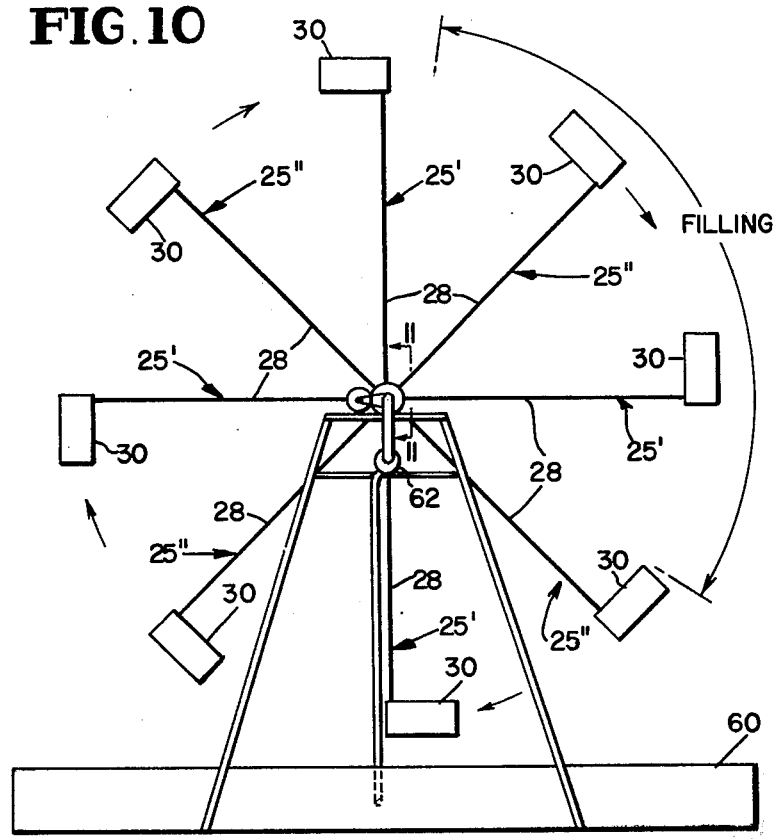
FIG. 10 illustrates a front elevation of another embodiment of the water wheel unit in which a pair of the water wheel assemblies are rotatably mounted on a common stationary axle.
Figure 11:
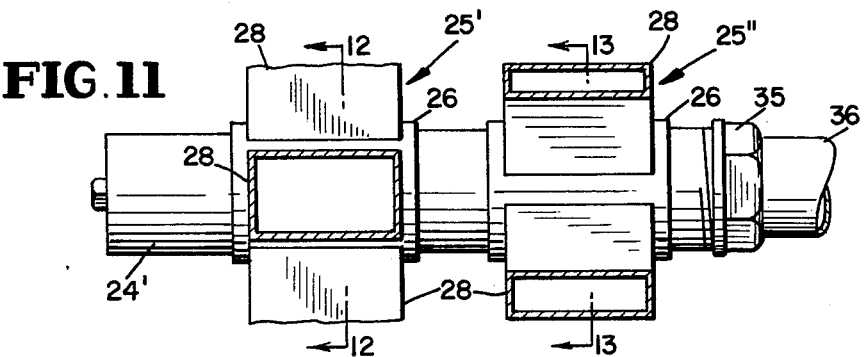
FIG. 11 is a fragmentary side elevation of the dual water wheel unit shown in FIG. 10.
Figure 12:
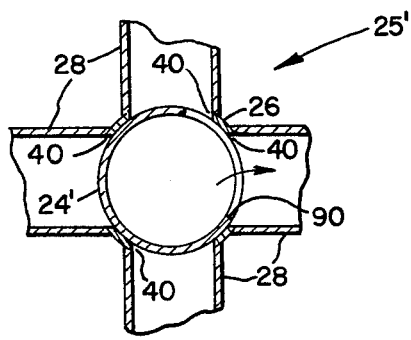
FIG. 12 is a section taken substantially along lines 12—12 of FIG. 11.
Figure 13:
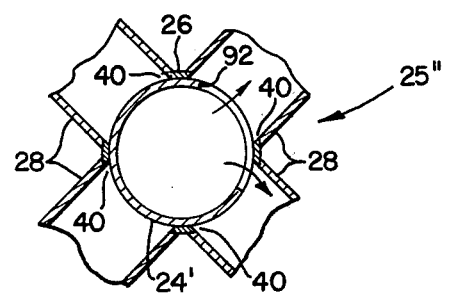
FIG. 13 is a section taken substantially along lines 13—13 of FIG. 11.
Figure 14:
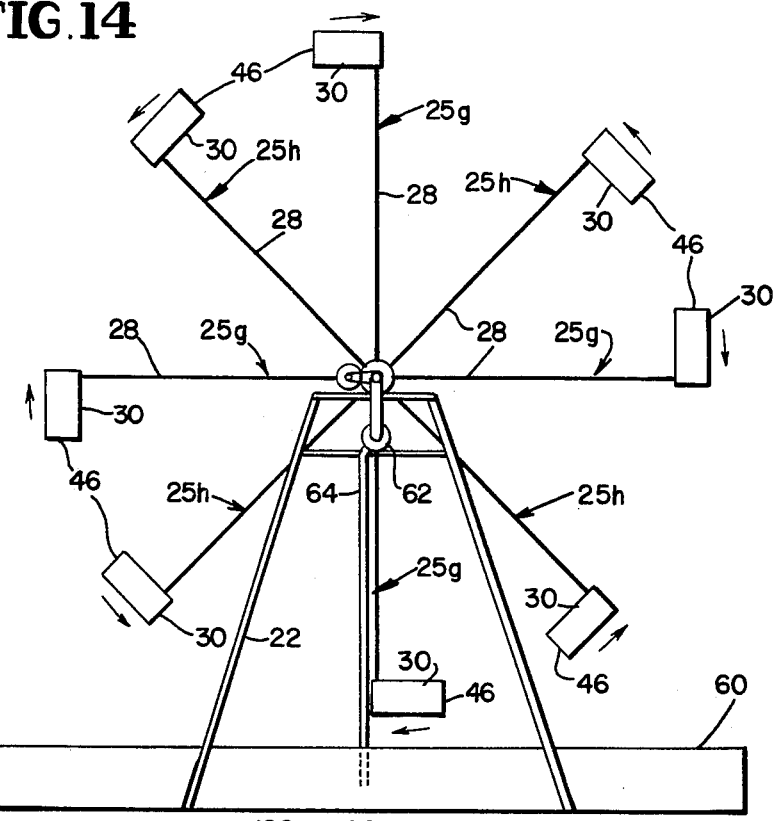
FIG. 14 is a front elevation of another dual water wheel unit in which the two water wheel assemblies are constructed and arranged to rotate in opposite directions.

As shown in FIG. 8, the water wheel unit 20, equipped with trough 60, may be located on the slope or side of a mountain or hill, at the top of which there is a lake or reservoir or other body of water 72. A second water wheel unit (indicated at 20a in FIG. 8) of the same construction as unit 20 may be located along the same slope or hillside at an elevation lower than water wheel 20. Since units 20 and 20a are of like construction, like reference numerals have been applied to designate like parts.

Water from the lake or reservoir 72 will be first delivered by pipe 36 to the water wheel unit 20 to drive unit 20. Water dumped from the containers 30 of unit 20 is collected in the trough 60 of unit 20. From there the water is conveyed by a pipeline 74 to the hollow axle 24 of water wheel unit 20a to drive unit 20a. The water dumped from containers 30 of unit 20a may be collected in the trough 60 of unit 20a to provide for the delivery of the water to still another water wheel unit (not shown) at a lower elevation or to some other place for other uses, such as drinking water. Units 20 and 20a are therefore driven serially by the energy in the descending water.

In FIG. 9 a group of water wheel units 20b, 20c, 20d and 20e, each equipped with a trough 60, may be arranged in a vertical column within a building or some other structure 76. Water wheel units 20b-20e are of the same construction as water wheel unit 20. Units 20b-20e are arranged so that their rotational axes are contained in a common vertical plane as shown.

Water for driving the water wheel arrangement shown in FIG. 9 may be stored in a suitable water tank (not shown) at the top of building 76 and delivered through a pipe 78 to the hollow axle of the topmost water wheel unit 20b to drive unit 20b.

The water dumped from unit 20b is collected in the trough 60 for unit 20b and from there delivered by a further pipe 80 to the hollow axle of the next lower water wheel unit 20c to drive unit 20c. The water dumped from unit 20c is in turn collected by the water trough 60 for unit 20c. From there the water is delivered by still another pipe 82 to the hollow axle of water wheel unit 20d for driving unit 20d. The water dumped from water wheel unit 20d is collected in the trough 60 for unit 20d, and from there the water is delivered by a further pipe 84 to the lowest water wheel unit 20e in the column.

If desired unit 20e may also be equipped with a trough 60 for collecting water dumped from unit 20e, and the collected water may, if desired, be pumped back by a pump 84 to the topmost water wheel 20b.

Each of the water wheel units 20b-20e may be equipped with its own alternator 54 as described in the embodiments of FIGS. 1 and 7.

From the foregoing description it will be appreciated that similar to the arrangement of water wheel units shown in FIG. 8 the water wheel units 20b-20e are driven serially by a falling or flowing body of water.

According to another aspect of this invention two or more water wheel assemblies corresponding to assembly 25 may be mounted on a common hollow axle. For example in FIGS. 10-13 two water wheel assemblies 25' and 25" are mounted on a common hollow stationary axle 24'. Each of the wheel assemblies 25' and 25" is the same as the wheel assembly 25. Accordingly, like reference numerals have been applied to designate like parts.

Axle 24' is provided with two axially spaced apart water discharge ports 90 and 92. Port 90 is used to supply water to wheel assembly 25' and port 92 is used to supply water to wheel assembly 25", all in a manner similar to that described for the preceding embodiments. Apart from the dual port construction described above, axle 24' is the same as axle 24.

In operation of the dual water wheel unit shown in FIGS. 10-13, water under pressure or an available head is delivered to the interior of axle 24'. As the inlet hub ports for the wheel spokes in wheel assembly 25' rotate into registry with the axle port 90, water will be delivered through the wheel spokes to the containers at the outer ends thereof. At the same time the inlet ports for the wheel spokes of wheel assembly 25" rotate into registry with the axle port 92, thereby delivering water from the interior of axle 24' through the wheel spokes to the containers 30 in wheel assembly 25". Both of the wheel assemblies 25' and 25" are thereby driven in a common direction by the water introduced into the interior of axle 24'.

In FIGS. 14-17 the water wheel unit is also provided with a pair of wheel assemblies 25g and 25h rotatably mounted on a common hollow axle 24" in a manner similar to that described for the embodiment of FIGS. 10-13. In the embodiment shown in FIGS. 14-17, however, wheel assemblies 25g and 25h are constructed to rotate in opposite directions rather than in a common direction.

Wheel assembly 25g is the same as wheel assembly 25. Wheel assembly 25h is the same as wheel assembly 25g except that wheel assembly 25h has its nozzle and container parts arranged in a direction opposite to that of wheel assembly 25g. Like reference numerals have been applied to designate like parts of the two wheel assemblies shown in FIGS. 14-17.

To accomodate rotation of wheel assemblies 25g and 25h in opposite directions the stationary axle 24" is provided with two axially and angularly spaced apart ports 94 and 96. Port 94 is located at about 2 o'clock as viewed from FIG. 16, and port 96 is located at approximately 10 o'clock as viewed from FIG. 17. Water under pressure is delivered through port 94 to drive wheel assembly 25g as the wheel spokes of assembly 25g pass through the 2 o'clock filling position and come into registry with port 94. Water under pressure is delivered through port 96 to drive wheel assembly 25h as the wheel spokes of assembly 25h pass through the 10 o'clock filling position to come into registry with port 96. Apart from ports 94 and 96, axle 24" may be of the same construction as axle 24.

Figure 15:
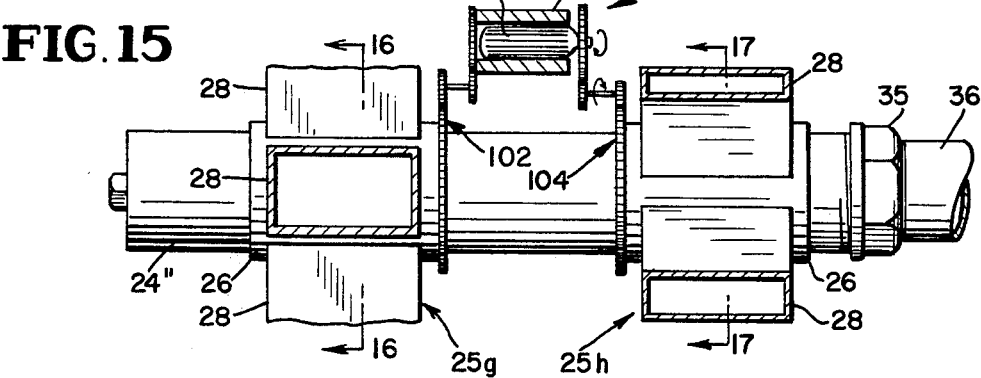
FIG. 15 is a fragmentary side elevation of the dual water wheel unit shown in FIG. 14 and illustrating the two water wheel assemblies connected to drive the field coil assembly and armature of an electrical generator in opposite directions.
Figure 16:
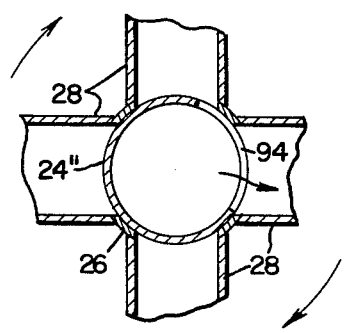
FIG. 16 is a section taken substantially along lines 16—16 of FIG. 15.
Figure 17:
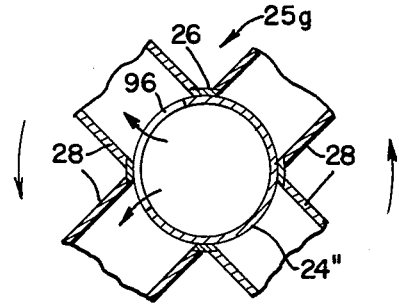
FIG. 17 is a section taken substantially along lines 17—17 of FIG. 15.

As shown in FIG. 15 the rotatable hub of wheel assembly 25g may be drive connected to a rotatably mounted field coil assembly 98 of a generator 100 by means of a gear train 102 to rotate the field coil assembly 98 in one pre-selected position. The rotatable hub of wheel assembly 25h may be drive connected by another gear train 104 to the rotatably mounted armature 106 of generator 100 to rotate the armature in a direction opposite to that in which the field coil assembly 98 is rotated. Thus, the field coil assembly and the armature of generator 100 are rotated in opposite directions by their respective water wheel assemblies 25g and 25h.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid driven rotary engine comprising a stationary axle having an interior space for receiving water or other liquid under pressure from an external source, and at least one spoked wheel assembly rotatable about the axis of said axle and comprising a hub rotatably supported on said axle, a set of angularly spaced apart wheel spokes extending radially from said hub and fixed at their inner ends to said hub for rotation therewith, a set of liquid collection containers each associated with and fixed to a different one of said spokes at the outer end thereof, each of said spokes being hollow and opening into the interior of the container that is fixed thereto, and said axle and said hub having apertures arranged to establish fluid communication between said interior space and each spoke for enabling liquid to flow through each spoke to the container at the outer end thereof for collection in the container as each spoke rotates through a pre-selected segment of the circular path of motion of said wheel assembly, said wheel assembly being rotated in a pre-selected direction by the force-exerting weight of the liquid collected in said containers, and each of said containers having an open end and being arranged to dump the liquid collected therein through its open end as it is rotated with its associated wheel spoke beyond said pre-selected segment.

2. The fluid driven rotary engine defined in claim 1 wherein the liquid-confining containers open in a direction opposite to that in which said wheel assembly is rotated by the weight of liquid collected in said containers.

3. The fluid driven rotary engine defined in claim 2 wherein each of said spokes terminates in a nozzle within its associated container for discharging a jet of the liquid delivered through the wheel spoke in a direction that provides a force for rotating said wheel assembly in said pre-selected direction.

4. The fluid driven rotary engine defined in claim 3 wherein each nozzle opens toward the open end of its associated container to discharge the jet of liquid toward said open end.

5. The fluid driven rotary engine defined in claim 4 wherein each nozzle extends along an axis that is at least approximately tangential to a circle having its center coincident with the rotational axis of said wheel assembly.

6. The fluid driven rotary engine defined in claim 1 wherein said axle is hollow to define said interior space and is open at one end to receive the liquid from said external source.

7. The fluid driven rotary engine defined in claim 1 comprising a device for generating electricity and motion transmitting means connecting said hub to said device for driving said device.

8. The fluid driven rotary engine defined in claim 1 comprising a trough disposed below said wheel assembly to collect the liquid that is dumped from said containers and means including a pump for delivering the liquid collected in said trough to said interior space of said axle.

9. A fluid driven rotary engine comprising a stationary axle having an interior space for receiving water or other liquid under pressure from an external source and at least first and second spoked wheel assemblies rotatably mounted on said axle and each including (a) a hub rotatably supported on said axle, (b) a set of angularly spaced apart wheel spokes extending radially from said hub and fixed thereto for rotation therewith, and (c) a set of liquid-confining containers each associated with and fixed to the outer end of a different one of said spokes, each spoke having a hollow interior in fluid communication with the interior of the container that is fixed thereto, there being aperture means in said axle and hub of each wheel assembly for enabling the liquid in said interior space to flow through each of said spokes to the container at the outer end thereof for collection in the container as each spoke is rotated through a segment of its circular path of motion about said axle, each wheel assembly being rotated in a pre-selected direction by the force-exerting weight of the liquid collected in its containers, and each container of each of said first and second assemblies having an open end and arranged to dump the liquid collected therein as it is rotated with its associated spoke beyond said pre-selected segment.

10. The fluid driven rotary engine defined in claim 9 wherein the containers of said first and second assemblies open in a common direction to effect the rotation of said assemblies in a common direction.

11. The fluid driven rotary engine defined in claim 9 wherein the containers of said first assembly open in one direction and the containers of said second assembly open in the opposite direction to effect rotation of said first and second assemblies in opposite directions.

12. The fluid driven rotary engine defined in claim 11 including an electrical generator having a rotatable field coil assembly, the hub of said first assembly being drive connected to said armature to rotate said armature in one pre-selected direction, and the hub of said second assembly being drive connected to said field coil assembly to rotate said field coil assembly in a direction opposite to the direction in which said armature is rotated.

13. A water wheel apparatus comprising at least first and second water units each having (a) a hollow axle and (b) a spoked water wheel assembly rotatably mounted on said axle and including (i) a set of liquid-collecting containers and (ii) angularly spaced apart hollow hub-mounted wheel spokes supporting said containers and providing for the flow of water or other liquid from the interior of said axle to said containers for cyclic collection in the containers and discharge from the containers, each water wheel assembly being rotated through a 360 degree angle in a single predetermined direction by the force-exerted weight of liquid collected in its containers, means mounting said first unit to locate the axis of its axle at a first elevation below a body of water or other liquid, means mounting said second unit to locate the axis of its axle at a second elevation below said first elevation, first conduit means for delivering water from said body to the axle of said first unit, a trough positioned below the wheel assembly of said first unit for collecting the water discharged from the containers of said first unit, and further conduit means for delivering the water collected in said trough to the hollow axle of said second unit.

* * * * *